Nov. 20, 1962     J. V. WEINBERGER ET AL     3,065,351
SHIELD FOR IONIZING RADIATION
Filed March 14, 1960     4 Sheets-Sheet 1
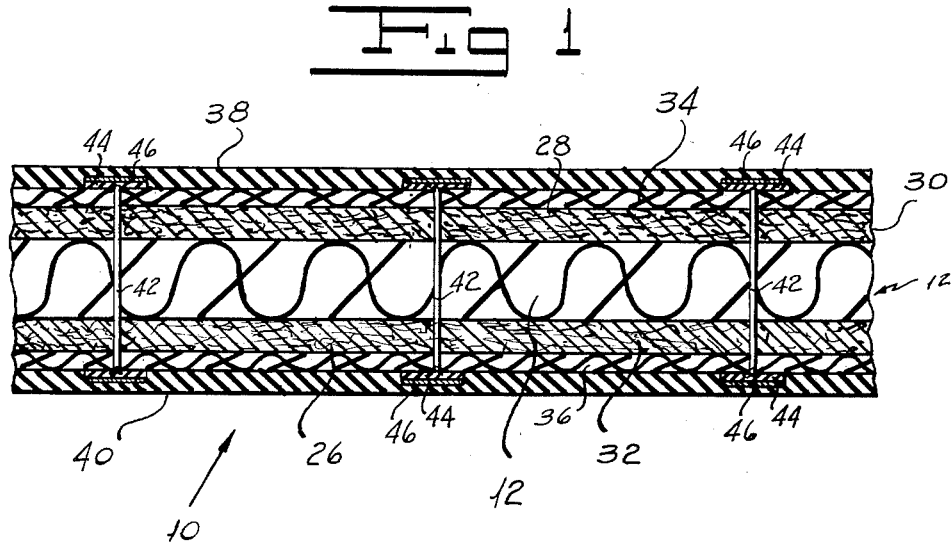
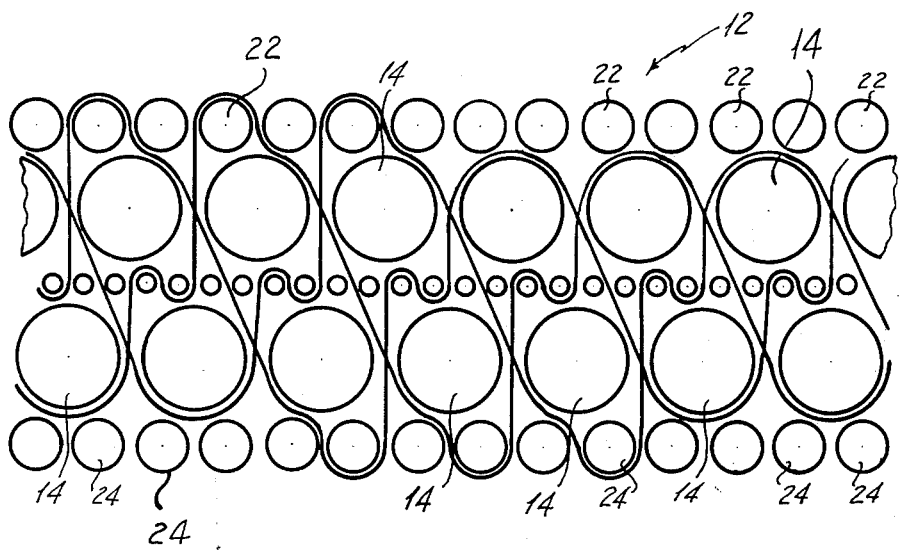
INVENTORS
JAN V. WEINBERGER
AUGUSTE LUISADA
BY
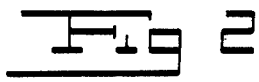
ATTORNEY

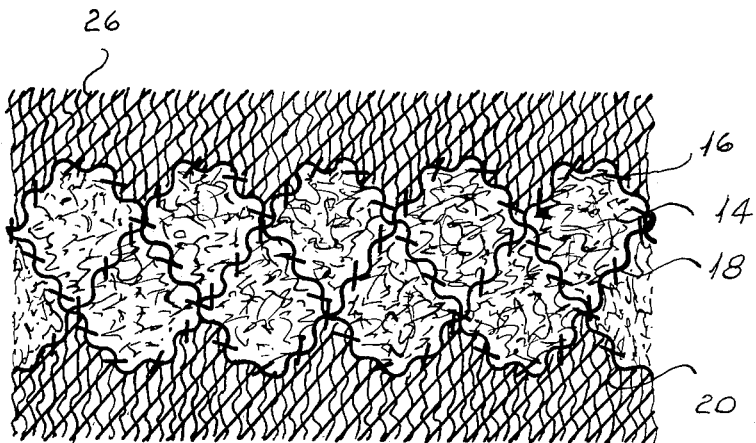
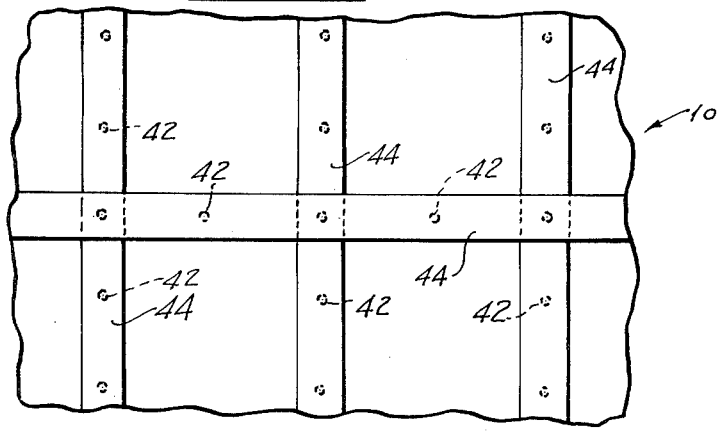
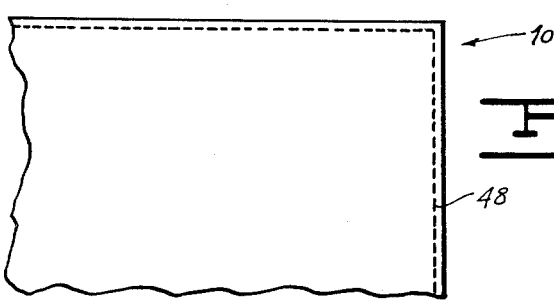

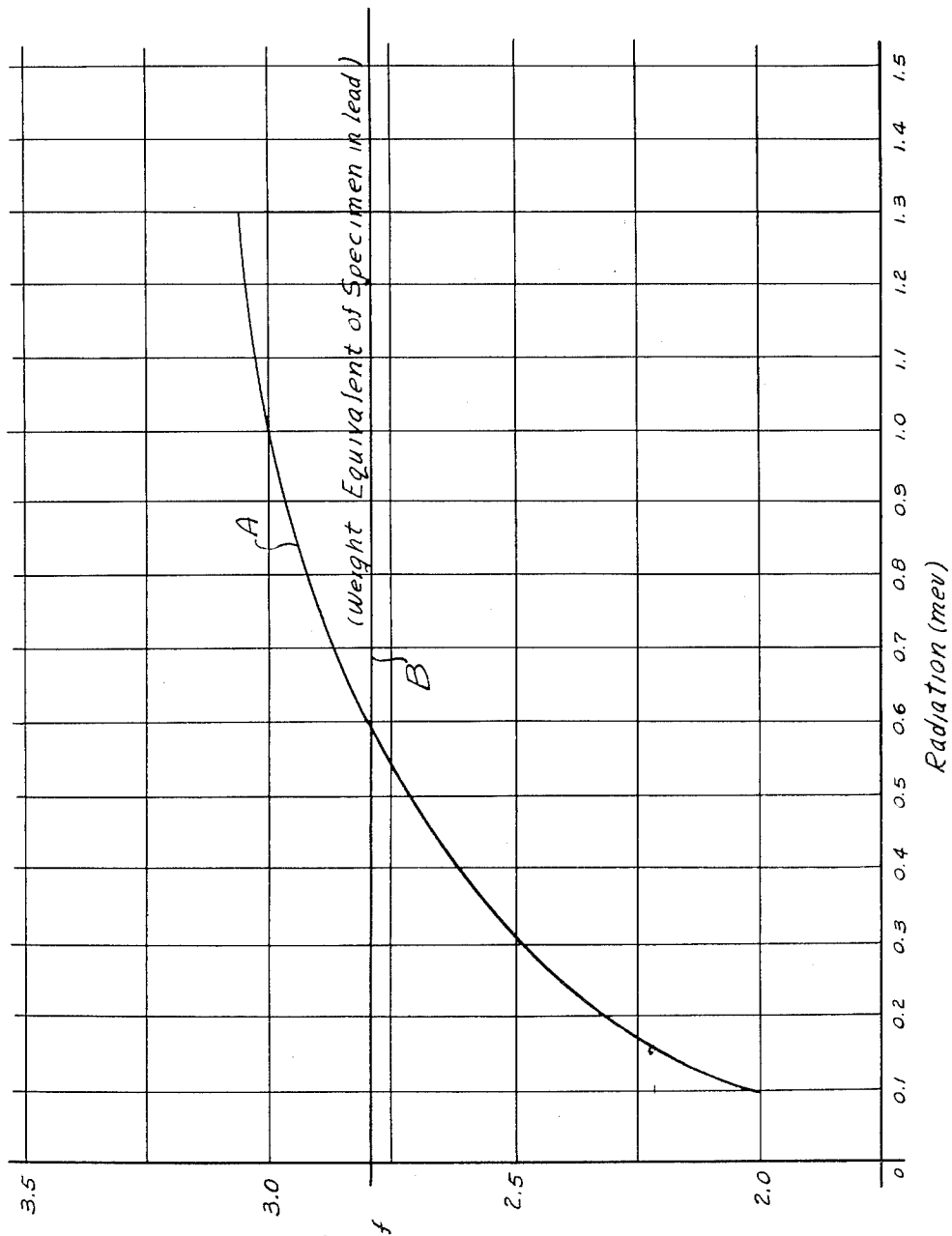

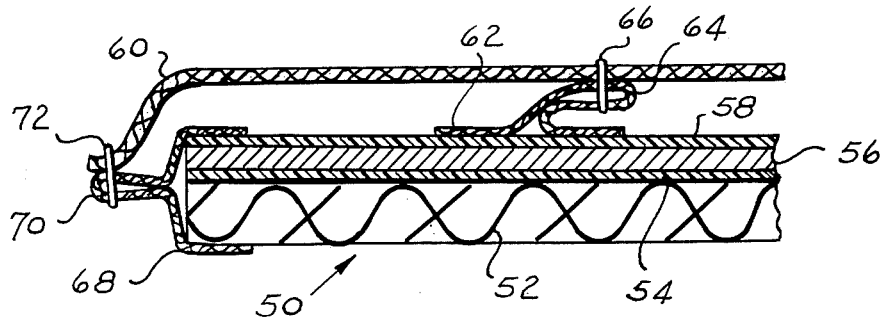
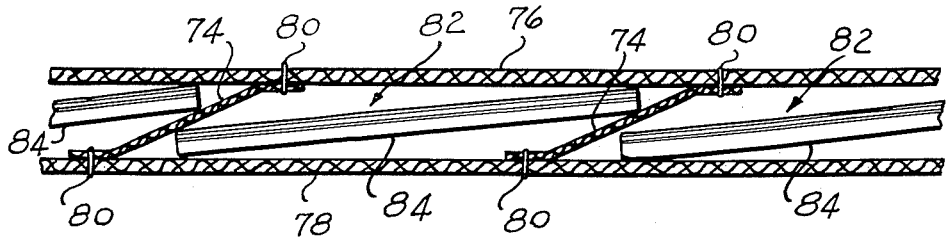
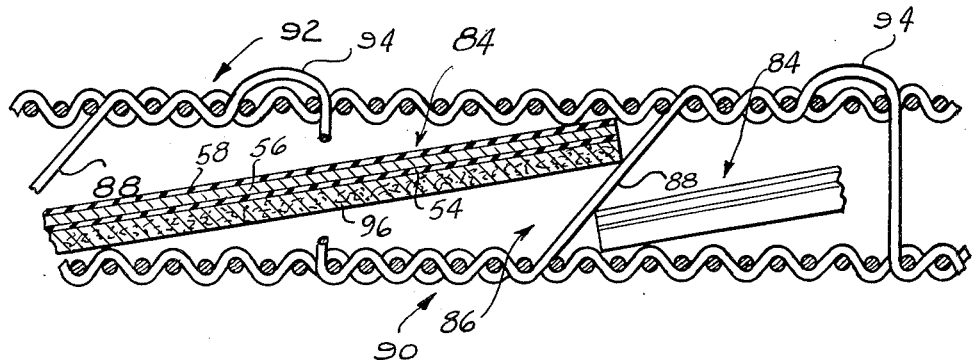

United States Patent Office 3,065,351
Patented Nov. 20, 1962

3,065,351
SHIELD FOR IONIZING RADIATION
Jan V. Weinberger, Ottawa, Ontario, Canada, and August G. Luisada, Waymart, Pa., assignors to Gentex Corporation, New York, N.Y., a corporation of Delaware
Filed Mar. 14, 1960, Ser. No. 14,725
14 Claims. (Cl. 250—108)

Our invention relates to a shield for ionizing radiations and more particularly to a protective shield having improved properties over radiation shields known in the prior art.

It is known in the prior art that lead resists penetration by ionizing radiation at the lower energy level. Lead in the form of thick shields or sheets is used to afford protection against harmful effects of such radiation. While this form of shield is satisfactory in many instances, in other cases the shields such as are known in the prior art are not satisfactory. For example, where the shield has a relatively simple form, a sheet may readily be shaped to this form. Where, however, the shield is to have a relatively complex contour, such as where it is to be used to protect parts of a patient's body internally or externally other than those being subjected to medical treatment from the effect of radiation, formation of a sheet to the required shape is difficult. Similar conditions apply to the shielding of the bodies of persons who are occupationally exposed to radiation, like maintenance crews of reactors and persons similarly employed. Sheets or plates of lead also are useful where the shield is permanently formed to the shape in which it is used and where it is not required to flex or bend in use. It will be appreciated that sheet or plate lead is not as satisfactory as is desired where a protective garment is to be formed. In such a case the protective sheet or plate is disposed in pockets in a garment, thus leaving many parts of the body exposed to the harmful effect of radiation. Not only is sheet lead difficult to shape into many desirable forms but also it is extremely heavy for the amount of protection afforded.

We have invented a shield for ionizing radiations which at once protects against the harmful effect of ionizing radiation and at the same time is pliable to permit it to flex in use. Our radiation resistant shield is readily formed to any desired shape such, for example, as the shape of a garment. Our radiation resistant shield has sufficient structural strength to support its own weight in use without damage. Our shield has good structural stability. Pound for pound our shield affords greater protection against ionizing radiation than does a lead sheet. In addition, our shield resists heat for a long period of time. We have also invented a method of making a shield for ionizing radiation having the desirable characteristics outlined above.

One object of our invention is to provide a shield for ionizing radiation which at once protects against the harmful effects of ionizing radiation and which at the same time is pliable to permit the shield to flex in use.

Another object of our invention is to provide a shield for ionizing radiation which is more resistant pound for pound to such radiation than is a lead sheet.

Still another object of our invention is to provide a shield for ionizing radiation which may readily be formed to any desired shape.

A further object of our invention is to provide a shield for ionizing radiation which has sufficient structural strength to support its own weight in use.

Still another object of our invention is to provide a shield for ionizing radiation which has good structural stability.

A still further object of our invention is to provide a shield for ionizing radiation which is resistant to the application of heat for a relatively long period of time.

Yet another object of our invention is to provide a method for making a shield for ionizing radiation.

Other and further objects of our invention will appear from the following description.

In general our invention contemplates the provision of a shield for ionizing radiation in which a carrier supports a coating of an amalgam of lead and mercury. In one form of our invention, a dough of a rubber-like compound of an amalgam of substantially equal parts of lead and mercury is adhered to one or both faces of the carrier which may be a sheet of rigid or semi-rigid material or which may be a fabric. Where it is desired that the shield be resistant to heat for a relatively long period of time, we form the carrier from a suitable heat resistant material such as thermal cloth.

In a second form of our invention, we spray hot molten lead on the faces of the carrier which may be heat resistant cloth having brushed faces. We soak the sprayed cloth in mercury to soften the lead coating and to enhance the radiation resistant property of the fabric. After the excess mercury has been squeezed from the cloth, we secure thin fabric layers over the coated faces of the heat resistant fabric and may cover these thin fabrics with a coating of a mixture of a material such as neoprene and lead.

In the accompanying drawings which form part of the instant specification and which are to be read in conjunction therewith and in which like reference numerals are used to indicate like parts in the various views:

FIGURE 1 is a sectional view of one form of our shield for ionizing radiation.

FIGURE 2 is a weaving diagram illustrating the manner in which we form the central heat resistant layer of the form of our shield for ionizing radiation shown in FIGURE 1.

FIGURE 3 is a sectional view of the central heat resistant layer of the form of our shield for ionizing radiation shown in FIGURE 1 after its surfaces have been brushed.

FIGURE 4 is a fragmentary view of our shield for ionizing radiation showing one means for holding the shield layers in assembled relationship.

FIGURE 5 is a fragmentary view of our shield for ionizing radiation showing an alternative means for holding the shield layers in assembled relationship.

FIGURE 6 is a graph demonstrating the effectiveness of our shield for inonizing radiation in resisting penetration by radiation in terms of an equal weight of lead.

FIGURE 7 is a fragmentary sectional view of another form of our shield for ionizing radiation.

FIGURE 8 is a fragmentary sectional view showing one manner in which our shield for ionizing radiation may be incorporated in a supporting structure.

FIGURE 9 is a fragmentary sectional view showing another manner of forming pockets for the reception of lengths of our shield for ionizing radiation.

Referring now more particularly to FIGURES 1 to 5 of the drawings one form of our shield for ionizing radiation, indicated generally by the reference character 10, includes a central layer 12 of a heat resistant fabric. This fabric 12 is a modified form of the Heat Resistant Woven Cloth shown and described in Patent No. 2,884,018, issued April 28, 1959, to H. A. Delcellier and Jan V. Weinberger.

As is pointed out more fully in the Delcellier et al. patent, referred to hereinabove and as is shown in detail in FIGURE 3, the fabric layer 12 comprises a plurality of large gauge wefts 14 bound together by intersecting woven binding fabrics 16, 18, and 20. The large gauge wefts 14 are formed for the most part from a material which passes directly from the solid to the gaseous state upon the application of heat. Materials which are suitable for this purpose are acrylic fibers such, for example, as dynel and Orlon. Dynel is a synthetic fiber made by the copolymerization of 40% acrylonitrile and 60% vinyl chloride. Orlon is the registered trade-mark of E. I. du Pont de Nemours and Company for a synthetic fiber made principally from polyacrylonitrile. These acrylic fibers are present in the form of fine staple filaments and are spaced by animal fibers, such, for example, as by wool or by a material such as acetate fibers and nylon to prevent breaking and to reduce the shrinking of the acrylic fibers under heat. We form the woven binder fabrics 16, 18, and 20 from yarns made up for the most part from inorganic, incombustible fibers such, for example, as glass fibers or metal. Preferably, we employ glass fibers and twist these fibers with a fiber of a material such as saponified acetate to improve the weaving characteristics of the fibers. While the binder fabrics 16, 18, and 20 are formed for the most part from glass fiber yarns, as is shown in FIGURE 2, we form the outboard weft yarns 22 and 24 from a brushable material such, for example, as a blend of Angora hair and fine wool. The inner fabric 12 just described is a modified form of the fabric shown and described in Patent No. 2,884,018 referred to hereinabove. In the fabric shown in that patent only the lower weft yarns 24 are formed from brushable yarns. In the modified from of fabric which we employ in this form of our invention, we also form the upper weft yarns 22 from a brushable material to facilitate the application of a lead coating to be described hereinafter to both faces of the fabric 12 to obtain a greater surface area of the brushed material for the better adhesion of the lead particles. Preferably we incorporate boron oxide in the layer 12 to provide a neutron trap. This boron oxide may be in solution in alcohol or it may be in the form of a suspension of finely divided powder in water.

After having formed the heat resistant fabric layer 12 of this form of our shield in the manner described hereinabove, we brush both faces of the fabric 12 to raise respective piles 26 and 28 from the layers of weft yarns 22 and 24 as shown in FIGURE 3. When this has been accomplished on any suitable type of brushing machine known to the art, we coat the faces of the heat resistant fabric 12 with layers 30 and 32 of lead. We accomplish this by first spraying one face of the fabric and then spraying the other face. As is known in the art, the metal to be applied may be fed to a spray gun as wire or in powdered form. It is melted in an oxyacetylene or oxyhydrogen flame and blown out in finely divided form by an air blast. The spray consists of semi-molten particles which impinge on the faces of the fabric 12 to form the adherent coatings 30 and 32. The piles 26 and 28 facilitate the operation of adhering the metal coatings 30 and 32 to the faces of the fabric 12. The coatings 30 and 32 each having, for example, a thickness of 1.25 mm. each afford the same protection as would a 3.5 mm. lead sheet under given circumstances without making the fabric rigid.

It is to be noted that fabric layer 12, which has a high resistance to heat, forms an excellent base for the reception of the coatings 30 and 32. This layer 12 inhibits the passage of the heat of the hot molten material from one face to the other of the fabric. Thus, after having applied the coating to one face of the fabric, we may then spray the hot molten material on the other face without danger of destroying the fabric and without danger of melting the coating previously applied to the other face of the fabric due to the heat resistant qualities of the fabric as such.

We have discovered that as the coatings 30 and 32 applied to the faces of the fabric 12 harden, they tend to become rigid or brittle and may be peeled off. After the coatings 30 and 32 have been applied to the faces of the fabric 12 in the manner described hereinabove, we soak the coated fabric in mercury for a period of approximately one hour. This operation of soaking the coated fabric in mercury softens the coatings 30 and 32 by the action of the mercury in forming an amalgam with the lead already applied to the faces of the fabric. While this operation of soaking the coated fabric in mercury softens the coatings 30 and 32, at the same time the material of the coatings loses some of its cohesion.

We next secure relatively thin woven fabric layers 34 and 36 to the faces of the coated fabric by any suitable means. We employ any appropriate means for holding the layers of our ionizing radiation resistant thermal cloth in assembled relationship. In one form of our shield, as shown in FIGURES 1 and 4, we use quilting threads 42 for holding the outer fabric layers 34 and 36 assembled. It will be appreciated that such stitches 42 pierce the metal layers 30 and 32 to provide openings through which radiation may leak. To prevent such radiation leakage, we apply lengths of a suitable pressure sensitive tape 44 having a coating 46 of lead or lead amalgam over the lines of quilting threads. These lead-coated lengths of tape effectively prevent leakage of radiation through the cloth. In an alternative form of our cloth we stitch the cloth around its periphery with stitching 48. Any other suitable means for securing the fabrics 34 and 36 to the assembly may be employed. The fabrics 34 and 36 may be woven from any conventional textile material such, for example, as cotton or the like.

After having applied the thin fabric layers 34 and 36 to the assembly, we use any suitable means known to the art for applying outer coatings 38 and 40 to the assembly. We form the outer coatings, for example, as a mixture including approximately fifty percent by volume of lead and of neoprene. These outer layers 38 and 40 of a mixture of lead and neoprene adhere to the outer surfaces of the thin fabric layers 34 and 36. With the application of these outer layers 38 and 40, our shield for ionizing radiation which is complete in a form which is especially adapted for the manufacture of articles of clothing and the like as well as shields which are used to protect the various parts of the human body from the harmful effects of radiation in the course of radiation treatment or by means of curtains or garments in areas in which maintenance crews are working in the vicinity of sources of radiation.

Referring now to FIGURE 6 we have shown the results of an actual test of a sample of our shield for ionizing radiation. The abscissa is expressed in terms of mega-electron-volts while the ordinate is expressed in terms of equivalent shielding afforded by millimeters of lead. Curve A represents the radiation resistant effect of our shield for ionizing radiation. The lower portion of the curve was determined by use of an X-ray source of radiation while the upper region of the curve was determined using cobalt 60 as a source of radiation. Curve B represents the radiation resistance of a sheet of lead having a weight which is the equivalent of the sample of our shield tested. A comparison of the two curves readily demonstrates the superiority in the higher radiation region of our shield over a specimen of lead which is the weight equivalent of our sample.

Referring now to FIGURE 7, another form of our shield for ionizing radiation, indicated generally by the reference character 50, includes a base of carrier 52 which may be the thermal cloth referred to hereinabove, asbestos-glass cloth, aluminum screen, or any other more or less flexible support: In this form of our invention we first apply to one or to both faces of the carrier 52 one or more coats 54 of a cement containing synthetic rubber such as neoprene or other plastic materials which are spread on the carrier 52 by any suitable means such as a spreader machine of a type known in the art. This neoprene cement may, for example, be made up in parts by weight of 100 parts of a synthetic rubber such as neoprene, 10 parts zinc oxide, 4 parts magnesium oxide, 10 parts antimony tri-oxide, 40 parts alumina, 1 part of a suitable accelerator, and 2½ parts of an antioxidant. This mixture is prepared in a manner known to the art by mixing it in a rubber mill and dissolving it in 400 parts of toluene. The resulting compound can readily be spread on the face of the carrier by a knife or by rollers.

After having applied the layer of neoprene cement 54 to the carrier 52, we next apply a layer of lead amalgam 56 over the cement. One manner in which we prepare this amalgam is to mix 100 parts by weight of lead with 100 parts of mercury at a temperature of about 300° F. and allow it to cool to form an amalgam. When this has been done, the amalgam is placed in a bag and squeezed in a press to squeeze out an amount of mercury which is approximately equal to 50 parts of the original mixture. We place the solid mass remaining in the bag in a ball mill and mix it with neoprene cement of the type described hereinabove. There are about 3 parts of cement solids to about 100 parts of amalgam solids. When this has been done, we take the mercury which previously was squeezed out and we incorporate it into the amalgam and cement mixture in the form of fine droplets by squeezing this mercury through a fine orifice under pressure and stirring the amalgam and cement mixture as the droplets are mixed in.

When the amalgam and cement mixture has been formed in the manner described above, it may readily be spread over the coating of neoprene cement 54 in as many coats as are desired to form a layer of the amalgam 56 of the desired thickness. After having applied the amalgam 56 over the layer of neoprene cement 54, we then apply coats of the neoprene cement over the amalgam 56 to form a layer 58 of neoprene cement. If desired, these operations may be performed on both faces of the carrier 52. When these operations are complete, then the assembly is cured in a conventional manner.

We have discovered that an amalgam made up of equal parts of lead and mercury is more effective as a shield against ionizing radiation than is an amalgam containing less mercury. The method described above of incorporating the lead and mercury amalgam into the cement has the additional advantage of preventing the migration of mercury to the lower parts of the layer or carrier after a period of time in storage of the assembly; that is, the neoprene cement prevents individual droplets of mercury from wandering in the compound. It is to be understood that, while we have described our compound as comprising a neoprene base, it could be modified with a phenolic plastic or we would use a silicone rubber compound having a high degree of heat resistance.

In the form of our invention shown in FIGURE 7, we can assemble the shield 50 on a supporting cloth 60 or the like in the following manner. We may, for example, cement onto the neoprene 58 before vulcanization a strip 62 of strong cloth to form a fold or pleat 64 in the cloth. We may employ stitching 66 for securing the strips 62 to the supporting cloth 60. In this manner it is not required that stitches pass directly through the amalgam 56. We may also adhere a strip 68 of strong fabric over the edge of the shield 50 to form a loop 70. Loop 70 may be secured by stitches 72 to the supporting cloth 60. This manner of assembling the shield on a supporting cloth has the outstanding advantage that it avoids the need for passing stitches through the amalgam layer to detract from the efficiency of the shield in protecting against ionizing radiation.

Referring now to FIGURE 8, we may secure strips 74 to spaced supporting cloths 76 and 78 by any suitable means such as by stitching 80 to form a plurality of pockets, indicated generally by the reference character 82, for receiving strips or lengths 84 of the shield. It is to be noted that, in the view shown in FIGURE 8, the strips 74 extend diagonally between the fabrics 76 and 78 so that the edges of adjacent lengths 84 overlap to prevent any gaps or spaces in the assembly through which ionizing radiation might pass.

FIGURE 9 shows an alternate means of forming pockets, indicated generally by the reference character 86. In this form of our invention, we float weft or filling threads 88 diagonally between a lower fabric, indicated generally by the reference character 90, and an upper fabric, indicated generally by the reference character 92. After the floated yarns reach the upper fabric, they are woven into the fabric for a sufficient distance to hold the yarns in place. Each floated yarn then forms a loop 94 and is returned to the lower fabric 90 and is woven into this fabric until the next diagonal float is to be formed. When this has been done, the loops 94 are cut by any suitable means known to the art.

In the manufacture of the form of our shield for ionizing radiation shown in FIGURES 1 to 5, we first weave the central layer 12 of heat resistant cloth with the rows of outer warps 22 and 24 of brushable material. When the fabric has been formed, we brush both its faces to provide the piles 26 and 28. We then deposit lead particles onto the piles 26 and 28 by suitable means to form the radiation resistant layers 30 and 32. After forming the coated faces of the fabric layer 12, we then soak the coated fabric in mercury to form a pliable amalgam making up the layers 34 and 36. When this has been accomplished, we secure the thin fabric layers 34 and 36 to the assembly by use of quilting threads or any other suitable means. We next coat the outer faces of the thin fabric layers 34 and 36 with a mixture of lead and an elastomer by any suitable method known to the art to form the outer layers 38 and 40 which complete our radiation resistant cloth. When the cloth has thus been formed, we may manufacture garments of any type or we may form shields to any desired contour from the finished fabric. In this form of our invention we have shown the strips 84 as including layers 54, 56 and 58 carried by a fibrous carrier 96.

It is to be noted that owing to the bulk afforded by the layer 12 of heat resistant cloth the layers 30 and 32 of lead may shift somewhat relative to each other to provide a high degree of pliability in our fabric. At the same time the layers 30 and 32 afford the same degree of protection against radiation as does a relatively rigid sheet having greater thickness and weight than the combined layers 30 and 32. The brushed piles 26 and 28 provide the maximum surface area to which the sprayed lead coating can adhere.

In the manufacture of the form of our invention shown in FIGURE 7, we first apply the neoprene cement 54 to one or both faces of the carrier 52. We next form the amalgam paste or dough in the manner described above and apply it over the neoprene layer 54 in a number of coats to build up a thickness to give the required degree of protection against ionizing radiation. When this has been accomplished, we apply the outer layer of neoprene cement 58. After curing in a conventional manner, we assemble the shield on a support cloth 60 as shown in FIGURE 7; or alternatively we may assemble it either in the manner shown in FIGURE 8 or in the manner shown in FIGURE 9.

It will be seen that we have accomplished the objects of our invention. We have provided a shield for ionizing radiation which affords a high degree of protection against ionizing radiation while at the same time being pliable to permit its formation into shields having various shapes. Our shield has greater resistance to penetration by ionizing radiation than does the equivalent weight of lead. Our shield has sufficient structural strength to support its own weight without rupturing. At the same time it has good structural stability so that it will not deform on a bias when in use. Our shield affords the same degree of protection as does a relatively rigid sheet of the prior art at lesser weight under given circumstances. Our shield may be made to have a high degree of resistance upon exposure to heat for a prolonged period of time.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A shield for ionizing radiation including in combination a base layer, a layer of adhesive carried by said base layer, a layer comprising lead amalgam adhered to said base layer by said adhesive layer and a protective layer of rubber-like material overlying said amalgam layer.

2. A shield for ionizing radiation including in combination a base layer, a layer comprising lead amalgam carried by said base layer, means comprising pleated strips carried by the assembly of said base layer and said amalgam layer, a supporting member, and stitching for securing said pleated strips to said supporting member.

3. A shield for ionizing radiation including in combination a plurality of lengths each comprising a base layer and a layer including lead amalgam and a carrier for said lengths including a support formed with pockets for receiving said lengths, said pockets being formed with diagonally extending side walls whereby the edges of said lengths overlap.

4. A shield for ionizing radiation including a base layer and a layer comprising a lead amalgam having substantially equal parts of lead and mercury carried by the base layer and means for positioning said amalgam layer on said base layer.

5. A shield for ionizing radiations including in combination a base layer of cloth, a layer of lead amalgam carried by said cloth and means for retaining said lead amalgam layer on said base layer.

6. A shield for ionizing radiations including in combination a base layer of cloth, respective layers of lead amalgam carried by the opposite surfaces of said base layer and means for retaining said lead amalgam layers on said base layer.

7. A shield for ionizing radiations including in combination a base layer of fabric, respective layers of lead amalgam carried by the opposite surfaces of said base layer, respective fabric layers laid over said lead amalgam layers and means for securing all layers in assembled relationship to retain said amalgam layers on said base layer.

8. A shield for ionizing radiations including in combination a base layer of cloth, respective layers of lead amalgam carried by the opposite surfaces of said base layer, respective fabric layers laid over said lead amalgam layers, means for securing all layers in assembled relationship to retain said amalgam layers on said base layer and respective abrasion resistant coatings on said fabric layers.

9. A thermal cloth resistant to ionizing radiations including in combination a base layer of heat resistant cloth having brushed opposite surfaces, respective layers of lead amalgam carried by said brushed surfaces and means for retaining said amalgam layers on said brushed surfaces.

10. A thermal cloth resistant to ionizing radiations including in combination a base layer of bulky heat resistant cloth comprising filler yarns made up of a major portion of acrylonitrile polymer, respective lead amalgam layers carried by the opposite surfaces of said base layer and means for retaining said amalgam layers on said base layer surfaces.

11. A thermal cloth resistant to ionizing radiations including in combination a base layer of heat resistant cloth, respective layers of lead amalgam carried by the opposite surfaces of said base layer, respective fabric layers laid over said amalgam layers, means for holding said layers in assembled relationship and respective coatings comprising a minor quantity of boron oxide carried by said base layer.

12. A thermal cloth resistant to ionizing radiations including in combination a base layer of heat resistant cloth, respective layers of lead amalgam carried by the opposite surfaces of said heat resistant cloth, respective fabric layers laid over said amalgam layers, quilting stitches for holding said layers assembled and tapes with coatings comprising lead for covering said quilting stitches.

13. A method of making thermal cloth resistant to ionizing radiations including the steps of brushing the opposite faces of a base layer of thermal cloth to raise piles on said faces, applying lead amalgam layers to said opposite faces and retaining said amalgam layers on said base layer.

14. A method of making thermal cloth resistant to ionizing radiations including the steps of brushing the opposite faces of a base layer of thermal cloth to raise piles on said faces, applying to said opposite faces layers of lead, treating said coated base layer with mercury to produce an amalgam, removing the excess mercury from said amalgam and retaining said amalgam layers on said base layer.

References Cited in the file of this patent

UNITED STATES PATENTS

| | | |
|---|---|---|
| 2,003,752 | Landt | June 4, 1935 |
| 2,212,270 | Kohler | Aug. 20, 1940 |
| 2,312,921 | Tubow | Mar. 2, 1943 |
| 2,328,105 | Strobino | Aug. 31, 1943 |
| 2,441,945 | Frolich | May 25, 1948 |
| 2,640,937 | Munday | June 2, 1953 |
| 2,726,339 | Barst | Dec. 6, 1955 |
| 2,920,981 | Whitehurst | Jan. 12, 1960 |